Nov. 23, 1965    J. K. GOGIA ETAL    3,219,943
COMMON MODE REJECTION INPUT CIRCUIT
Filed Jan. 18, 1961
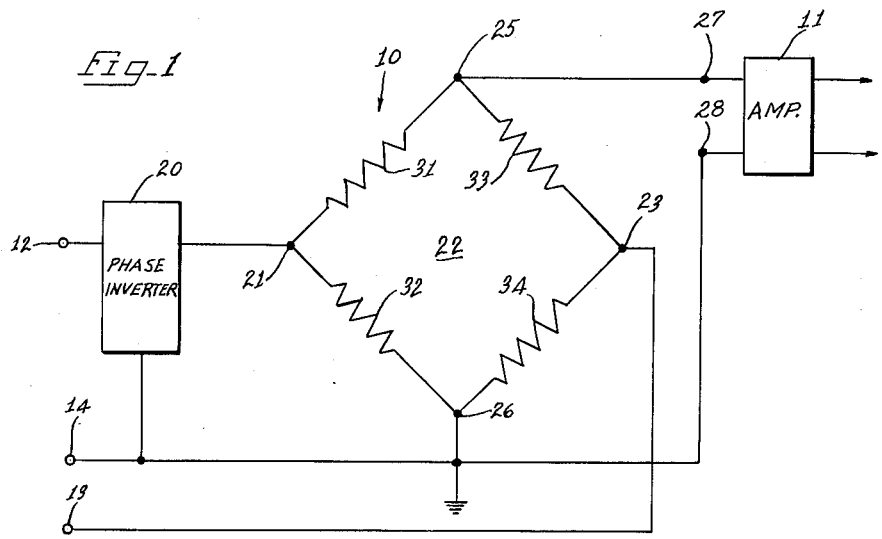
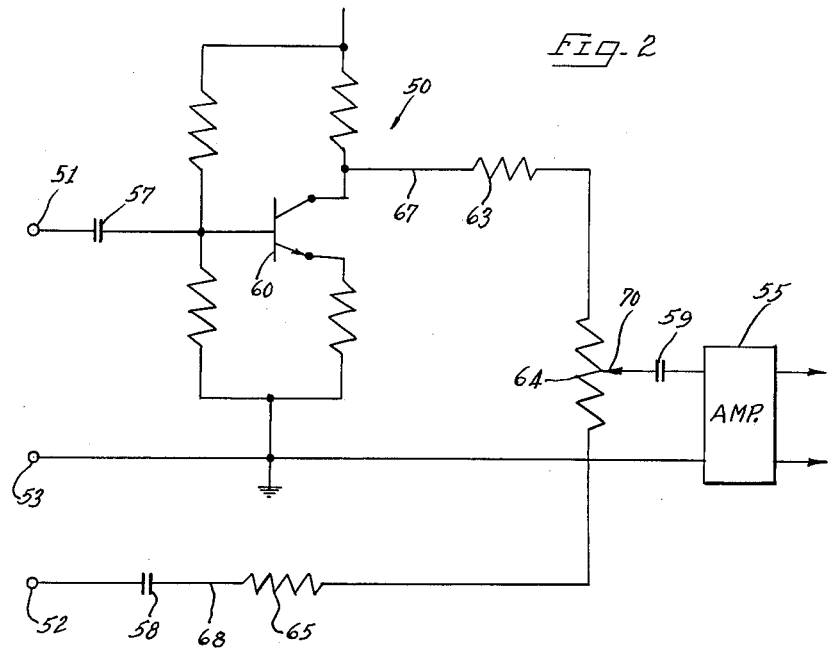
INVENTORS
Jugal K. Gogia
BY Robert W. Artrip
Attys.

United States Patent Office 3,219,943
Patented Nov. 23, 1965

3,219,943
COMMON MODE REJECTION INPUT CIRCUIT
Jugal K. Gogia, Cleveland Heights, and Robert W. Artrip, Northfield, Ohio, assignors to TRW Inc., a corporation of Ohio
Filed Jan. 18, 1961, Ser. No. 83,505
6 Claims. (Cl. 330—69)

This invention relates to a common mode rejection input circuit and particularly to such a circuit for use with electrocardiograph or electroencephalograph amplifiers or other low level signal systems with a floating ground type input.

It is an object of the present invention to provide a simple and effective circuit for providing rejection of like polarity input signals and transmission of unlike polarity input signals.

A further object of the present invention is to provide a novel common mode rejection input circuit especially adapted for use with electrocardiograph or electroencephalograph amplifiers or other systems having a floating ground type input.

Other important objects, features and advantages of the present invention will be apparent from the following detailed description taken in connection with the accompanying drawings, in which:

FIGURE 1 is a diagrammatic illustration of a first common mode rejection input circuit in accordance with the present invention; and FIGURE 2 is a diagrammatic illustration of a second embodiment of common mode rejection input circuit in accordance with the present invention.

FIGURE 1 illustrates a common mode rejection input circuit 10 associated with an ampifier 11 for electrocardiograph or electroencephalograph or other low signal level applications where the input is of the floating ground type. The circuit 10 distinguishes a signal fluctuation which is ot be measured from a spurious fluctuation in potential of both input leads relative to ground potential by rejecting any common mode fluctuation in the potential of input terminals 12 and 13 relative to ground terminal 14, while transmitting fluctuations in the potential difference between the input or signal terminals 12 and 13. The signal terminal 12 is connected through a phase inverter component 20 to one terminal 21 of a resistance bridge circuit 22 and the other input terminal 13 is connected to a terminal 23 of the bridge 22. The opposite terminals 25 and 26 of the bridge circuit are connected to output terminals 27 and 28 which in turn are connected to the input of single ended amplifier circuit 11, which may be a known type electrocardiograph or electroencephalograph amplifier. The resistors 31, 32, 33 and 34 may have equal resistance, for example, so that any potential difference applied between points 21 and 23 produces essentially a zero voltage difference between points 25 and 26 and a zero input to the amplifier 11. On the other hand, when points 21 and 23 simultaneously change in potential relative to the potential of point 26 of the bridge circuit, point 25 of the bridge circuit will have a corresponding change in potential to provide a corresponding input to amplifier 11.

Since inverter 20 is interposed between terminal 12 and terminal 21 the result is that changes in potential between terminals 12 and 13 are transmitted to amplifier 11 while spurious common mode changes in the potential of terminals 12 and 13 relative to terminal 14 produce no change in the potential of terminal 25 relative to terminal 26 and a zero input to amplifier 11.

FIGURE 2 illustrates a second embodiment of the present invention wherein a common mode rejection circuit 50 is interposed between input terminals 51, 52 and 53, and an amplifier 55 such as an electrocardiograph or electroencephalograph amplifier. As in the previous embodiment, it is the purpose of the rejection circuit 50 to filter out any spurious common mode fluctuations in the potential of signal terminals 51 and 52 relative to ground potential. Coupling capacitors 57, 58 and 59 are of course selected to transmit the desired signal frequency variations. In the circuit of FIGURE 2, a transistor 60 is operated as a phase inverter and preferably is operated in its linear region with substantially unity gain. A like change of potential of terminals 51 and 52 with respect to terminal 53 produces a potential difference across resistor 63, potentiometer 64 and resistor 65 in series, with the potential at line 67 of one polarity relative to grounded terminal 53 and line 68 at an opposite potential relative to the grounded terminal 53. By suitable adjustment of the moving contact 70 associated with potentiometer 64, the potential of the moving contact 70 can be adjusted to equal the potential of terminal 53 and thus provide a zero input to the amplifier 55 for common mode fluctuations in the potential of terminals 51 and 52.

On the other hand, a change in the potential difference between signal terminals 51 and 52 will produce potentials of the same polarity at lines 67 and 68 with respect to the ground terminal 53 and a corresponding potential at the input of amplifier 55.

It will be apparent that many modifications and variations may be effected without departing from the scope of the novel concepts of the present invention.

We claim as our invention:
1. A common mode rejection input circuit comprising
   (a) means providing a common reference point in said circuit,
   (b) first and second circuit input terminals for receiving respectively first and second input signals relative to said common reference point,
   (c) first and second circuit output terminals one of which being connected to said common reference point for delivering a signal proportional to the difference between said first and second input signals irrespective of any common mode variations in said first and second input signals,
   (d) a phase inverter having inverter input terminals connected to said first circuit input terminal and to said common reference point respectively and having a pair of inverter output terminals one of which being connected to said common reference point, and
   (e) means comprising a polarity sensitive network consisting exclusively of passive circuit means for responding to signals of the same polarity and of equal amplitude at its input terminals to provide a corresponding output signal at its output terminals but producing a zero output in response to signals of opposite polarity but of equal amplitude at its input terminals,
   (f) said passive circuit means having its input terminals connected to the other of the output terminals of said phase inverter and to said second input terminal respectively and having its output terminals connected to said circuit output terminals to provide for rejection of common mode signals which appear at said circuit input terminals.

2. The common mode rejection input circuit of claim 1 wherein said polarity sensitive network comprises a balanced resistance bridge having its input terminals connected respectively to the other of the output terminals of said phase inverter and to said second input terminal respectively and having its output terminals connected to said circuit output terminals, said bridge being balanced to provide a zero output potential at its output terminals in response to signals of opposite polarity but of equal amplitude at its input terminals.

3. A common mode rejection input circuit comprising
 (a) means providing a common reference point in said circuit,
 (b) first and second circuit input terminals for receiving first and second input signals relative to said common reference point,
 (c) first and second circuit output terminals for delivering a signal proportional to the difference between said first and second input signals irrespective of any common mode variations in said first and second input signals,
 (d) a phase inverter having inverter input terminals connected to said first circuit input terminal and to said common reference point respectively and having first and second inverter output terminals,
 (e) a polarity sensitive network consisting essentially of passive resistance means having a pair of input terminals connected respectively to the first output terminal of said phase inverter and to said second circuit input terminal and having an output terminal connected to first circuit output terminal,
 (f) means connecting said second output terminal of said phase inverter and said second circuit output terminal to said common reference point, and
 (g) means providing a balanced condition of said resistance means with respect to said output terminal of said network such that common mode variations in said first and second input signals produce a zero output at said output terminal of said network relative to said common reference point while said resistance means transmits a signal corresponding to the difference between said first and second input signals relative to said common reference point to said first circuit output terminal.

4. A common mode rejection input circuit comprising
 (a) means providing a common reference point in said circuit,
 (b) first and second circuit input terminals for receiving respectively first and second input signals relative to said common reference point,
 (c) first and second circuit output terminals for delivering a signal proportional to the difference between said first and second input signals irrespective of any common mode variations in said first and second input signals,
 (d) a phase inverter having inverter input terminals connected to said first circuit input terminal and to said common reference point respectively and having first and second inverter output terminals,
 (e) a balanced resistance bridge having its input terminals connected respectively to the first output terminal of said phase inverter and to said second circuit input terminal and having its output terminals connected to said circuit output terminals respectively, and
 (f) means connecting said second output terminal of said phase inverter and said second circuit output terminal to said common reference point,
 (g) said bridge circuit being responsive to signals of the same polarity and of equal amplitude at its input terminals to provide a corresponding output signal at its output terminals but producing a zero output in response to signals of opposite polarity but of equal amplitude at its input terminals.

5. A common mode rejection input circuit comprising
 (a) means providing a common reference point in said circuit,
 (b) first and second circuit input terminals for receiving respectively first and second input signals relative to said common reference point,
 (c) first and second circuit output terminals for delivering a signal proportional to the difference between said first and second input signals irrespective of any common mode variations in said first and second input signals,
 (d) a phase inverter having inverter input terminals connected to said first circuit input terminal and to said common reference point respectively and having first and second inverter output terminals,
 (e) resistance means connected in a series circuit between said first inverter output terminal and said second circuit input terminal comprising a potentiometer having a moving contact connected to the first circuit output terminal,
 (f) means connecting said second output terminal of said phase inverter and said second circuit output terminal to said common reference point,
 (g) said moving contact of said potentiometer being adjustable to provide a balance condition of said resistance means such that common mode variations in said first and second input signals produce a zero output at said circuit output terminals while said moving contact of said potentiometer receives a signal corresponding to the difference between said first and second input signals relative to said common reference point.

6. A common mode rejection input circuit comprising
 (a) means providing a common reference point in said circuit,
 (b) first and second circuit input terminals for receiving respective first and second input signals relative to said common reference point,
 (c) first and second circuit output terminals one of which being connected to said common reference point for delivering a signal proportional to the difference between said first and second input signals irrespective of any common mode variations in said first and second input signals,
 (d) a phase inverter having inverter input terminals connected to said first circuit input terminal and to said common reference point respectively and having a pair of inverter output terminals one of which being connected to said common reference point, and
 (e) means comprising a polarity sensitive network consisting exclusively of passive circuit means for responding to signals of the same polarity and of equal amplitude at its input terminals to provide a corresponding output signal at its output terminals but producing a zero output in response to signals of opposite polarity but of equal amplitude at its input terminals,
 (f) said passive circuit means comprising a resistor having one resistor terminal thereof connected to the other of said inverter output terminals and having an opposite resistor terminal thereof connected to said second circuit input terminal respectively and said network having its output terminals connected to the circuit output terminals with the output terminal of said network connected to the other of the circuit output terminals being connected with the resistor intermediate said resistor terminals to provide an output voltage relative to said common reference point intermediate the potentials at the resistor terminals.

(References on following page)

References Cited by the Examiner
UNITED STATES PATENTS

| | | | |
|---|---|---|---|
| 1,800,962 | 4/1931 | Scheppmann | 333—74 |
| 2,199,820 | 5/1940 | Gannett | 330—116 |
| 2,396,531 | 3/1946 | Reiskind et al. | 330—116 |
| 2,434,610 | 1/1948 | Feiker | 324—98 X |
| 2,440,682 | 5/1948 | Hansel | 324—101 X |
| 2,771,583 | 11/1956 | Bloch | 330—69 X |
| 2,946,955 | 7/1960 | Kuhrt | 324—101 |
| 2,977,547 | 3/1961 | Talambiras | 330—69 |
| 3,015,773 | 1/1962 | Herrman | 333—74 X |
| 3,121,845 | 2/1964 | Fails | 330—69 |

ROY LAKE, *Primary Examiner.*

ELI J. SAX, *Examiner.*